United States Patent Office 3,103,927
Patented Sept. 17, 1963

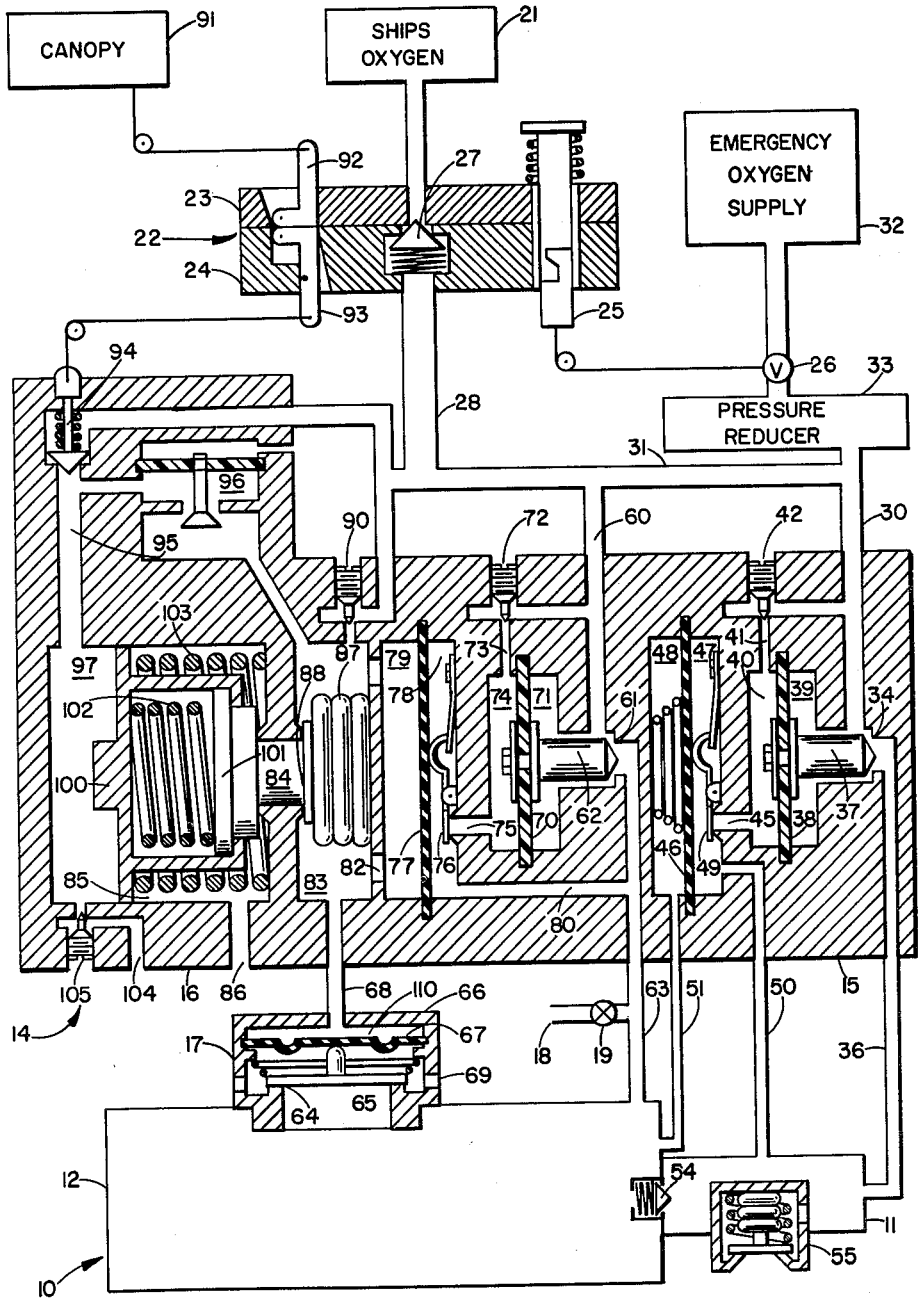

3,103,927
PRESSURE CONTROL SYSTEMS
John W. Henneman, Rock Island, Ill., and James A. Mientus, Davenport, Iowa, assignors to The Bendix Corporation, a corporation of Delaware
Filed Oct. 21, 1959, Ser. No. 847,716
5 Claims. (Cl. 128—144)

This invention relates to pressure control systems particularly for aviators' enclosures such, for example, as pressure suits.

At very high altitudes, ambient atmospheric pressures become so low that aviators suffer very harmful effects and it is essential that means be provided to apply at least the minimum physiologically safe pressure to apply at least the minimum physiologically safe pressure to their bodies. This can be accomplished by pressuring the cabin of the craft; but in view of the possibility that the cabin may become decompressed or that aviators must abandon the craft at high altitude, it is common to provide them with pressurized garments. This invention, while entirely suitable for controlling pressures in cabins or capsules, is especially suited to gas pressure control of aviators' garments.

An object of the invention is to provide an improved control system, especially one in which supply of respiratory gas and body pressurizing gas are simultaneously controlled.

Another object is to provide an improved respiratory and pressurizing controller which can accompany the aviator if he abandons his craft in flight and will provide increased protection in the abandonment procedure.

The drawing, in a single figure, illustrates schematically one embodiment of the invention, it being understood that various modifications in this embodiment and other embodiments of the invention are possible without departing from the scope of the appended claims.

In the drawing, the numeral 10 designates an aviator's suit comprising a helmet section 11 and a body encompassing section 12. The numeral 14 designates a gas flow regulator, the right section 15 of which controls the flow of respiratory gas to the helmet 11. The left section 16, together with the suit exhalation valve 17, controls pressurization of the body section 12 of the suit.

During normal flight, the body encompassing section 12 of the suit is inflated by ventilation air from a source, not shown, in the aircraft. Air enters through conduit 18 and valve 19 which is manually controlled by the aviator. In normal flight the aircraft cabin is pressurized and air is circulated through the suit only to cool the pilot's body. In this condition the suit pressure control section 16 of regulator 14 is not used but the respiratory section 15 functions as a demand regulator. The suit pressure control section is activated automatically when the cabin is decompressed or the aviator takes action to abandon the craft.

Referring to the upper portion of the drawing, oxygen is supplied to the controller from a ship's source 21 through a "disconnect" structure 22, the upper section 23 of the disconnect is fixed to the aircraft whereas the lower section 24 is detached and remains with the aviator when he abandons the craft. The disconnect 22 includes a release member 25, of common form, for opening a valve 26 to connect the regulator 14 to an emergency oxygen source 32 when the pilot bails out. In this event check valve 27 in the lower section of the disconnect, closes the supply line 28 leading to the ship's oxygen supply.

*Respiratory Regulator*

The respiratory gas control section of regulator 15 comprises a gas inlet passage 30 connected to an oxygen distribution manifold 31 which, in turn, is connected to the ship's oxygen supply line 28 and to the emergency oxygen supply 32 through pressure reducer 33 and valve 26. Passage 30 extends through a valve seat 34 to an outlet passage which is connected by a conduit 36 to the helmet 11 of suit 10. The main valve head 37, which cooperates with seat 34, controls the flow of respiratory gas from manifold 31 to helmet 11. It is carried by a flexible diaphragm 38 whose annular margins are held fixed within the body of regulator 14 and whose central portion divides a cavity within the body into two chambers. One of these, chamber 39, is termed the main valve pressure closing chamber.

Respiratory gas at inlet 30 flows past head 37 into chamber 39 applying pressure to diaphragm 38 in a direction tending to lift head 37 from seat 34. The opposite face of diaphragm 38 is exposed to main valve closing pressure chamber 40 into which respiratory gas flows from inlet passage 30 via a passage 41 at a rate which is restricted by a needle valve 42. After some delay gas pressure in chamber 40 builds up to a pressure equal to that in chamber 39. The pressure in chamber 40 is exerted against diaphragm 38 in a direction tending to close the main valve. When the pressures in these two chambers 39 and 40 are equal, diaphragm 38 holds valve head 37 against the seat 34.

Chamber 40 is connected by a passage 45 to a second cavity which is divided by a diaphragm 46 into two chambers 47 and 48. The passage 45 is normally closed by pilot valve 49. Actuating elements connected to this valve engage the central portion of diaphragm 46 whereby the pilot valve is opened when diaphragm 46 is moved to the right into chamber 47. The sensing passage 50 connects chamber 47 with the interior of helmet 11. Inhalation suction of an aviator wearing the helmet 11 results in withdrawal of gas from chamber 47 through sensing passage 50. The pressure in chamber 47 being thus reduced, diaphragm 46 is moved into the chamber and acts upon the actuating elements of the pilot valve whereby the pilot valve is opened and the pressure in main valve pressure closing chamber 40 is relieved by flow of gas from chamber 40 through passage 45 into inhalation sensing chamber 47. The pressure in chamber 40 having been relieved, the pressure in main valve pressure opening chamber 39 moves diaphragm 38 to open the main valve 34, 37 and respiratory gas is permitted to flow from inlet 30 past the valve to conduit 36 and thus into the helmet 11. Pressure within helmet 11 must be no less than the pressure within the body encompassing portion 12 of suit 10 and at high altitudes it must be maintained at a pressure not less than minimum physiologically safe pressure.

It will be apparent later that the requisite pressure is maintained in portion 12 of the suit. Accordingly, the pressure within section 12 of the suit is applied by a passage 51 to the chamber 48 one wall of which is formed by the opposite side of diaphragm 46. Applied to the diaphragm, pressure in chamber 48 acts to open the pilot valve 49 in slight degree whereby the pressure in chamber 40 is reduced to a value slightly below the pressure in chamber 39 and the main valve is opened slightly to apply the requisite positive pressure in helmet 11.

Sections 11 and 12 of the suit are connected by a passage which is held normally closed by a check valve 54. The check valve is biased and arranged so that gas will flow from the helmet section 11 to the body section 12 when the pressure in the helmet exceeds the pressure in the body portion 12 by some small fixed amount. The check valve prevents reversed flow.

Numeral 55 designates an anti-suffocation valve by which the aviator may inhale ambient atmospheric gas if the main valve 34, 37 fails to open or if the oxygen supply is depleted.

Suit Pressure Regulator

Pressurizing gas is introduced into a body encompassing section 12 of suit 10 from manifold 31 via a suit regulator inlet passage 60, a main suit valve comprising a seat 61 and a head 62 and a passage 63. Pressurizing gas leaves the suit to atmosphere at ports 69 through an exhaust valve comprising a seat 64 and a head 65. The head 65 is biased against movement away from seat 64 by a spring and a diaphragm 67 whose annular margins are fixed in the wall of the casing 66 which, together with the diaphragm 67, defines a chamber 110. A suit control pressure developed in the suit regulator is applied by a passage 68 to chamber 110 and there acts on diaphragm 67 in a direction tending to close the head 65 against seat 64. Suit pressure is applied to valve head 65 in a direction tending to open the valve. Accordingly, the exhaust valve is opened to permit discharge of gas from the suit in a degree which is a measure of the difference between suit pressure and suit control pressure.

The mechanism for controlling actuation of the main suit valve 61, 62 may be, and is here shown to be, similar to that which actuates the main respiratory valve 34, 37. It comprises the diaphragm 70 to which head 62 is attached. This diaphragm extends across a cavity and defines a valve opening chamber 71 into which gas flows directly from manifold 31. Gas is also permitted to flow at a reduced rate past a needle valve 72 and through passage 73 into a chamber 74 on the opposite valve closing side, of main valve actuating diaphragm 70. After initial delay, during which pressure in chamber 74 is built up, the pressures in chambers 74 and 71 are equalized and valve head 62 is held closed against seat 61 by the diaphragm 70. The valve is opened by relieving the pressure in chamber 74 through a passage 75 which is normally maintained closed by a pilot valve 76.

The valve operation is controlled by a diaphragm 77 which extends across another cavity in the regulator body dividing it into a first chamber 78 and a pressure chamber 79. Increase in the pressure in chamber 79, or decrease of pressure in chamber 78, results in movement of diaphragm 77 into chamber 78 against actuating elements connected to pilot valve 76 whereby the pilot valve is opened. The pressure in chamber 78 is maintained at the pressure within section 12 of the suit by a passage 80 which connects chamber 78 with the suit supply passage 63.

Pressure in chamber 79, called control pressure, is maintained at ambient atmospheric pressure at low altitudes but at high altitudes is maintained at a substantially constant absolute pressure, equal to or greater than the minimum physiologically safe pressure. Chamber 79 communicates via passages 82 with an aneroid chamber 83 having an outlet 84 to a bail-out safety pressure chamber 85 which, in turn, is connected to atmosphere by a passage 86. Aneroid 87 in chamber 83 is arranged so that it can expand and carry its front face 88 into engagement with the regulator structure that defines outlet 84 whereby that opening will be closed. Gas from manifold 31 is permitted to flow into aneroid chamber 83 past a needle valve 90 which restricts the rate of such flow. In chamber 83 this gas exerts a force on aneroid 87 tending to contract the aneroid and open outlet 84. Ambient atmospheric pressure applied through passage 86, chamber 85 and outlet 84 and acting on the position in which it is shown, serves as an additional force tending to collapse aneroid 87 to open outlet 84. As altitude is increased the magnitude of this additional force is decreased and the result, as well known to workers in the art, will be to maintain a constant absolute pressure in chambers 83 and 79. Control pressure in chamber 79 tends to open pilot valve 76 and the main suit supply valve 61, 62. Suit pressure in chamber 78 acts on diaphragm 77 in a direction permitting pilot valve 76 and the suit supply valve 61, 62 to be closed.

Thus it will be seen that when altitude is increased and ambient pressure is decreased, control pressure will increase relative to ambient pressure. Thus the pressure in chamber 110 of the suit exhaust valve is increased and tends to hold the suit exhaust valve closed. In addition, this relative increase in pressure in chamber 79 acts on diaphragm 77 to open pilot valve 76 and main suit supply valve 61, 62 so that the pressure in suit 12 is increased relative to ambient atmospheric pressure as that atmospheric pressure is decreased. Stated another way, the absolute pressure in the suit remains relatively constant as altitude is increased.

The converse is true, of course. As ambient pressure increases incident to a decrease in altitude it will act on the interior of the suit increasing suit pressure and this pressure is applied to the underside of valve head 65 tending to lift it and relieve suit pressure. At the same time the increased ambient pressure is applied to aneroid surface 88 and tends to collapse aneroid 87. This permits increased escape of gas from chamber 83 and reduction in control pressure in chambers 83 and 79. In this action opposition to opening of the suit exhaust valve is diminished and diaphragm 77 moves, if it has not already done so, to close the pilot valve 76. As a consequence, pressure in main valve closing chamber 74 is increased and the main valve closes to stop the supply of pressurizing gas to the suit. Accordingly, the constant absolute suit pressure is maintained as altitude is reduced until a safe altitude is reached at which ambient pressure applied against aneroid face 88 results in substantial opening of outlet 84 and the pressure within aneroid chamber 83 becomes substantially ambient pressure.

Abandonment of Aircraft

When an aviator prepares to abandon his craft, he must take some action, such for example as pulling a release mechanism, which will open the aircraft canopy and propel him out of the aircraft. Various mechanisms are provided for this purpose but in every case the pilot must take some action which can be employed as a signal to actuate mechanisms in the suit regulator. In at least one aircraft the pilot releases the canopy prior to taking that action which propels him out of the craft with his seat. This arranegment has been selected for illustration.

A canopy 91 is shown to be connected by a cord to a lever 92 in the section 23 of the disconnect 22. As the canopy is blown away the card is pulled to rotate lever 92 and its rotational movement is effective to rotate a lever 93 in the other section of the disconnect. The rotation is momentary because the connecting cord to the canopy will break, but rotation of the lever 93 momentarily opens a valve 94 permitting flow of gas from manifold 31 into a passage 95 from whence it flows through a pressure limiting valve 96 to chamber 83 and to a piston chamber 97. This chamber and chamber 85 are separated by a piston 100. The piston is hollow and within its hollow it carries a second piston 101 which is biased by a spring 102 toward the right in the direction of outlet 84 of aneroid chamber 83. The degree of such rightward motion of piston 101 is limited by conformations in the wall of piston 100. Piston 100 is urged leftward by a biasing spring 103. However, upon opening of valve 94 and the introduction into chamber 97 of gas from manifold 31, piston 100 will be driven to the right, as shown, and piston 101 will engage the elements that define outlet opening 84 thus effectively closing the outlet 84 despite the fact that a corresponding increase in pressure in chamber 83 will collapse aneroid 87. Accordingly, the pressure in chambers 83 and 79, acting on diaphragm 67 of the suit exhaust valve, will be increased. This pressure will hold the valve closed with increased force. The increased pressure in chamber 79 acting on diaphragm 77 will operate to open the suit supply valve 61, 62 permitting rapid and substantial flow of gas from manifold 31 into the suit. Accordingly, the suit pressure is increased.

This increased pressure in the suit protects the pilot against the wind blast that he experiences as he is propelled from the aircraft.

Means are provided for relieving the pressure in chambers 97, 83, and 79 whereby the suit pressure will be returned to a magnitude correctly corresponding to current atmospheric pressure as he descends. In the embodiment of the invention selected for illustration, this means comprises an opening 104 connecting chamber 97 to atmosphere which includes a needle valve 105 adjusted to limit the rate at which the pressure in chamber 97 is dissipated. As this pressure is reduced a bias spring 103 moves piston 100 to the left. After some interval of time, during which the pressure in chambers 83 and 79 and the pressure in the suit are held constant at some high value, the aforementioned conformations in the wall of piston 100 will engage corresponding conformations in the outer wall of piston 101 and thereafter piston 101 will be moved to the left opening outlet 84 whereupon increased pressure in chamber 83 will be dissipated through outlet 84 until at some reduced pressure aneroid 87 again closes outlet 84 and assumes control of the pressure in chambers 83 and 79.

Accordingly, when the canopy is released the pressure within the suit is promptly increased to a value higher than normal. This increased pressure is maintained for some finite period and is thereafter dissipated. The pressure dissipation, in view of the action of aneroid 87 and as well understood in the art, will occur relatively more slowly than the pressure increase. By such pressure control the aviator's suit is promptly inflated to afford protection against wind blast. The inflation is maintained for some time in the anticipation that there might be some slight delay in actual abandonment of the craft and the additional pressure is relieved slowly to avoid unnecessary pressure shock.

Increased pressure in the suit is applied by a passage 51 to chamber 48 in the left of the sensing diaphragm 46 in the respiratory controller 15. Accordingly, diaphragm 46 is moved in a direction which results in opening the respiratory valve 34, 37 and increased protective pressure in the helmet 11.

*Operation*

During normal flight the respiratory gas regulator 15 supplies respiratory gas to helmet 11 in response to inhalation and at a pressure slightly greater than the pressure in the body encompassing section 12 of the suit. The suit regulator 16 is inoperative.

If for any reason the suit is not adequately pressurized, as by failure of the ship's air supply, closure of valve 19, decompression of the aircraft cabin, or abandonment of the craft, then this condition will be sensed as a pressure differential across diaphragm 77 and the suit regulator main valve 61—62 will open to admit gas to the suit until the requisite pressure is reached. If ambient pressure is not changed the valve 61—62 will not reopen and the suit exhaust valve will not open except to release gas in the amount that it is introduced into suit section 12 via exhalation check valve 54. When altitude is decreased so that ambient pressure decreases, the valve 61—62 will be held closed and the suit exhaust valve will open. In this sense gas flows into the suit through valve 61—62 from the pressurized source 21 or 32 or manifold 31 and thence flows through the suit and out the exhaust valve, it being understood that the gas flow may be but is usually not a continuous flow. In certain circumstances this gas flow may be characterized by discharge of gas from the suit long after its introduction into the suit.

On the occurrence of some signal indicating that the aviator is or may be abandoning the craft, suit pressure is promptly increased above normal, held above normal for a selected finite time, and the increase is then dissipated. Helmet pressure is varied so that it remains slightly above suit pressure, the difference in pressure being termed "safety pressure."

The means for maintaining suit pressure above normal for a selected finite time may, as shown, comprise a "lost-motion" connection between pistons 100 and 101. When pressurized gas is admitted to chamber 97 it acts on piston 100 to move it and piston 101 to the position shown. At this point piston 101 engages the edges of outlet 84 and its movement must stop. However, piston 100 is free to move and does move further to the right in the drawing by compression of springs 102 and 103. As the pressure in chamber 97 is relieved through opening 104, these springs urge piston 100 leftward but piston 101 remains in the rightward position closing outlet 104 until the end conformations of piston 100 engage the conformations or flange on piston 101. Thereafter the whole assembly moves left at a rate determined by the rate at which pressure in chamber 97 is relieved.

We claim:

1. In a regulator for controlling pressurization of a suit which includes an inlet and an exhaust valve subjected to suit pressure in a direction tending to open said exhaust valve, the combination of a suit having an inlet and an exhaust valve, a flow path connected to the suit inlet, a flow regulating valve in said flowpath, pressure sensitive means for actuating said flow regulating valve, means for applying suit pressure to said pressure sensitive means in a direction tending proportionally to the magnitude of said suit pressure to close said flow regulating valve, means for developing a control pressure which increases as a selected inverse function of altitude pressure, and means for applying said control pressure to said exhaust valve and said pressure sensitive means in a direction tending proportionally to the magnitude of said control pressure to close said exhaust valve and open said flow control valve.

2. The invention defined in claim 1 including means selectively sensitive to a condition independent of altitude pressure for increasing the magnitude of said control pressure and then dissipating said increase.

3. In an aviator's pressure suit system of the type in which pressurized gas, after flowing through a flow regulating valve, flows into the suit and thereafter flows out of the suit through a suit valve, in combination a suit, a flowpath for gas extending into and out of the suit and including the interior of the suit, a flow regulating valve in the portion of said flowpath extending into the suit and a suit valve in the portion of said flowpath extending out of said suit, first pressure sensitive means for actuating said flow regulating valve, second pressure sensitive means for actuating said suit valve, means for developing a control pressure which increases as a selected inverse function of altitude pressure, means for applying suit pressure to said first and second pressure sensitive means in a direction tending proportionally to the magnitude of said suit pressure to close said flow regulating valve and open said suit valve respectively, and means for applying said control pressure to said first and second pressure sensitive means in a direction tending proportionally to the magnitude of said control pressure to open said flow regulating valve and close said suit valve respectively.

4. A pressure controller for an aviator's pressure suit comprising a combination, a pressure suit, a passageway connected to said suit for directing a flow of pressurizing gas to said pressure suit, a valve in said passageway, an actuator for said valve including a pressure sensitive motive element sensitive to pressure variation to actuate said valve, means for subjecting said motive element to a gas pressure variable as a predetermined function of altitude pressure less the amount of the suit pressure, and means selectively sensitive to a condition independent of altitude pressure for increasing said gas pressure by a material amount independent of altitude pressures below a selected minimum altitude pressure including means for subsequently gradually relieving said increased pressure.

5. In combination, an aviator's suit having a separate head encompassing section to be maintained at a safety pressure higher than the pressure in the remainder of the suit, a controller comprising first and second passageways connected to said head encompassing section and said remainder of the suit respectively, first and second regulator means for controlling the flow of pressurizing fluid through said first and second passageways respectively each including a flow control valve having a diaphragm actuator sensitive to pressure magnitude to control the degree of opening of its associated flow control valve, means for applying to one of said diaphragms a pressure variable as a predetermined inverse function of altitude pressure less the amount of the suit pressure, means selectively sensitive to a condition independent of altitude pressure for applying increased pressure to said one of said diaphragms in material amount including means for subsequently relieving said increased pressure, and means for applying to the other of said diaphragms a pressure differing from that applied to said one of said diaphragms by the amount of said safety pressure.

References Cited in the file of this patent

UNITED STATES PATENTS

| | | |
|---|---|---|
| 2,867,227 | Meidenbauer | Jan. 6, 1959 |
| 2,929,377 | Cummins | Mar. 22, 1960 |

FOREIGN PATENTS

| | | |
|---|---|---|
| 1,172,206 | France | Oct. 13, 1958 |